(12) United States Patent
Olsson et al.

(10) Patent No.: US 12,520,022 B1
(45) Date of Patent: *Jan. 6, 2026

(54) DEEP WATER ENCLOSURES FOR LIGHTING AND IMAGING

(71) Applicant: SeeScan, Inc., San Diego, CA (US)

(72) Inventors: Mark S. Olsson, La Jolla, CA (US); Eric M. Chapman, Lake Tapps, WA (US); Jon E. Simmons, Poway, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/891,239

(22) Filed: Sep. 20, 2024

Related U.S. Application Data

(63) Continuation of application No. 17/715,648, filed on Apr. 8, 2022, now Pat. No. 12,101,540, which is a continuation of application No. 16/000,635, filed on Jun. 5, 2018, now Pat. No. 11,317,009.

(60) Provisional application No. 62/515,492, filed on Jun. 5, 2017.

(51) Int. Cl.
*H04N 23/51* (2023.01)
*F21V 31/00* (2006.01)
*G03B 17/08* (2021.01)
*H04N 23/56* (2023.01)
*F21W 107/20* (2018.01)

(52) U.S. Cl.
CPC ........... *H04N 23/51* (2023.01); *F21V 31/005* (2013.01); *G03B 17/08* (2013.01); *H04N 23/56* (2023.01); *F21W 2107/20* (2018.01)

(58) Field of Classification Search
CPC .......... F21V 31/005; F21W 2107/20; H04N 5/2252; H04N 5/2256; G03B 17/08
See application file for complete search history.

(56) References Cited

U.S. PATENT DOCUMENTS

| | | | | |
|---|---|---|---|---|
| 5,016,463 | A * | 5/1991 | Johansson | B21D 51/26 72/354.8 |
| 6,106,625 | A * | 8/2000 | Koai | C23C 16/455 118/724 |
| 6,111,776 | A * | 8/2000 | Russell | G02B 19/0066 365/120 |
| 9,097,632 | B2 * | 8/2015 | Lihl | G01N 1/42 |
| 9,151,484 | B1 * | 10/2015 | Olsson | F21V 31/00 |

(Continued)

FOREIGN PATENT DOCUMENTS

| CN | 103449718 | * 12/2013 | ............ C03C 3/087 |
|---|---|---|---|
| CN | 206100226 U | 4/2017 | |

(Continued)

OTHER PUBLICATIONS

"Trapezium dome design" https://geo-dome.co.uk/article.asp?uname=trap_dome (Year: 2008).*

(Continued)

*Primary Examiner* — Philip P. Dang
(74) *Attorney, Agent, or Firm* — Steven C. Tietsworth, Esq.; Michael J. Pennington, Esq.

(57) ABSTRACT

Enclosures for deep ocean or other high exterior pressure environment including a dome window with an angular measurement of between 164 and 178 degrees, a structure housing, a dome support ring, and a compliance material positioned between the dome support ring and housing are disclosed.

9 Claims, 13 Drawing Sheets

(56) References Cited

U.S. PATENT DOCUMENTS

| | | | | |
|---|---|---|---|---|
| 9,285,109 B1 * | 3/2016 | Olsson | ................... | F21V 29/70 |
| 9,416,957 B2 * | 8/2016 | Olsson | ................... | F21V 23/06 |
| 9,429,301 B2 * | 8/2016 | Olsson | ................... | F21V 15/01 |
| 9,506,628 B1 * | 11/2016 | Merewether | .......... | F21V 19/005 |
| 9,512,988 B2 * | 12/2016 | Olsson | ................... | F21V 29/83 |
| 9,574,760 B1 * | 2/2017 | Olsson | ................. | H05B 45/18 |
| 10,088,143 B2 * | 10/2018 | Olsson | ................. | F21V 23/006 |
| 10,215,394 B1 * | 2/2019 | Olsson | ................... | F21V 5/04 |
| 10,222,031 B1 * | 3/2019 | Olsson | ................. | H05B 45/50 |

FOREIGN PATENT DOCUMENTS

| | | | | |
|---|---|---|---|---|
| GB | 2002082 A | * | 2/1979 | ........... B25B 15/005 |
| JP | 2007159097 A | | 6/2007 | |

OTHER PUBLICATIONS

International Searching Authority, "Written Opinion of the International Searching Authority" for PCT Patent Application No. PCT/US18/36145, Dec. 13, 2018, European Patent Office, Munich.

* cited by examiner

DEEP WATER ENCLOSURES FOR LIGHTING AND IMAGING

FIELD

This disclosure relates generally to optical enclosures for use in deep water environments for lighting and/or imaging. More specifically, but not exclusively, this disclosure relates to optical enclosures including dome ports, dome support rings, and/or housings including features to enhance strength and durability to better survive repeated cycling between low and high pressures in deep ocean or other high exterior pressure environments.

BACKGROUND

Submersible optical enclosures for cameras and lights are well known in the art. Typical optical enclosures include a structural and waterproof housing in which a cameras and/or lights are placed. A transparent port/window attached to or integral with the housing allows light into or out of the enclosure for lighting and/or imaging applications. These enclosures generally include O-rings or other sealing and port elements to keep water or other fluids out, while allowing opening of or access to the interior of the housing for servicing, battery charging, downloading images, video, or data, and the like.

Most submersible optical enclosures in the art are designed for use in shallow water (i.e. less than about 10 feet or depth) or for high moisture and/or low pressure environments. As such, these enclosures are not subject to the higher pressures that are found at depths of tens of feet, hundreds of feet, or in some applications thousands of feet in the deep ocean. External stresses to enclosures due to high pressures in very deep water environments (e.g., at or below 1,000 meter depths) are extreme, and require sophisticated mechanical designs to withstand breakage and implosion, particularly for devices designed for repeated cycling into and out of deep water.

Typical enclosures for a swimming pool or hot tub light (typically designed for depths of 10-15 feet or less) will leak and/or fail entirely at depths of more than a few tens of feet. These types of common shallow water enclosures will instantly implode if subjected to deep ocean pressures, potentially with catastrophic consequences to other nearby devices or equipment (e.g., remotely operated vehicles (ROVs), instrumentation, etc.). As such, they are entirely unsuitable for deep ocean exploration or other deep ocean operations such as oil drilling or mining, or in other high pressure environments.

To those unfamiliar with the art of deep ocean optical engineering, enclosures for use in deep water environments may superficially share some attributes with enclosures used in pools or other shallow water environments or in damp or wet locations. However, unlike shallow water optical enclosures, deep water enclosures must be capable of surviving the substantial stresses resulting from pressures at depth, as well, in many applications, frequent pressure cycling from the surface to depth and back. These stresses are applied to both the housing itself as well as to joints between housing elements and seating or mating surfaces with other elements (e.g., optical ports), as well as with intermediate elements, seams, connectors, other discontinuities, weak points, and at other places where different materials are joined. In addition to varying changes in material properties due to pressure variations, temperature changes can also result in different material properties, which can increase stresses at joints or other material boundaries when the enclosure is subjected to temperature variations during use.

Withstanding external pressures at depth is critical requirement of any deep water optical enclosure or device. Hydrostatic pressure is greatly increased in deep water environments relative to shallow or surface level environments. For example, sea surface air and water pressures are around 1 atmosphere or 15 PSI. However, the pressure increases by about 1 atmosphere/15 PSI for every 10 meters of depth below the surface. Consequently, at 1000 meters, the external pressures are about 100 times those at the surface. At maximum ocean depths of around 10,000 meters the external pressures are about 1000 times those at the surface. This requires a high degree of skill and knowledge of material properties and other physical parameters as well as optics and other disciplines in order to design low failure risk enclosures and associated components.

Other stresses, such as changes in temperature during use, water characteristics (e.g., acidity, salinity, etc.), and other environmental variables can cause further stresses on optical enclosures during deep ocean use (or in other similar environments such as high pressure fluidic systems, etc.).

Deep ocean enclosures tend to be different from those for shallow use in various ways. For example, high strength materials are often used for deep water enclosures, as well as thicker housing walls, rounded housing shapes, and the like. Seating surfaces on the housing or on ports or windows of the enclosure may be polished to eliminate small defects and/or may be treated to strengthen them. Some optical enclosures use flat windows, while others for higher pressure environments use a dome window.

Existing optical enclosures for deep water use leave room for improvement in robustness and ability to survive the stresses and pressures of deep water environments. Further, robustness problems become compounded with the growing interest in housing physically large cameras and associated larger and more complex optics, such as those used in ultra-high definition cameras (e.g., 4K or higher resolution cameras). Larger and more complex cameras and lenses often require larger enclosures and windows/ports, and precision in optics becomes increasingly important with higher resolution imaging devices.

Accordingly, various embodiments of the present invention address the above-described and other problems in the art of deep water imaging and lighting.

SUMMARY

The present disclosure relates to optical enclosures for use in deep water environments. More specifically, but not exclusively, this disclosure relates to optical enclosures with enhanced strength and durability to survive deep water environments for housing camera and/or illumination components such as still or video cameras and LED or other lighting elements.

Deep water submersible optical enclosures in accordance with aspects of the present disclosure may include a transparent pressure bearing optical dome having an angular measurement of approximately 174 degrees. The optical dome may be seated on and coupled to a housing having a hollow interior, and an intermediate stepped dome support ring or spacer may be positioned between the housing and dome. The housing may enclose devices or systems such as RF antennas and/or cameras and/or lighting and may typically be engineered for use in deep ocean environments at or below 1,000 meters.

The intermediate dome support ring may have opposite annular faces that are substantially planar and parallel, with sections of different radial thickness such that a section closest to the dome window is structured to closely match the radial stiffness of the dome window, and a section closest to the housing is tuned to allow matched displacements of the dome support ring to that of the dome window. The substantially matched displacements may be used to minimize tensile stresses at the interface between the dome window and other components on which the dome window is supported when under high pressure loads.

Surfaces of the annular faces on the dome support ring may be textured with features to lock a compliance material layer positioned between the dome support ring and dome. Embodiments of optical enclosures may further include one or more coupling elements that join and secure together the housing and dome window, with the dome support secured therebetween, as well as seals to prevent ingress of water.

Various additional aspects, details, features, and functions are described below in conjunction with the appended drawing figures.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Overview

Figure 1A:
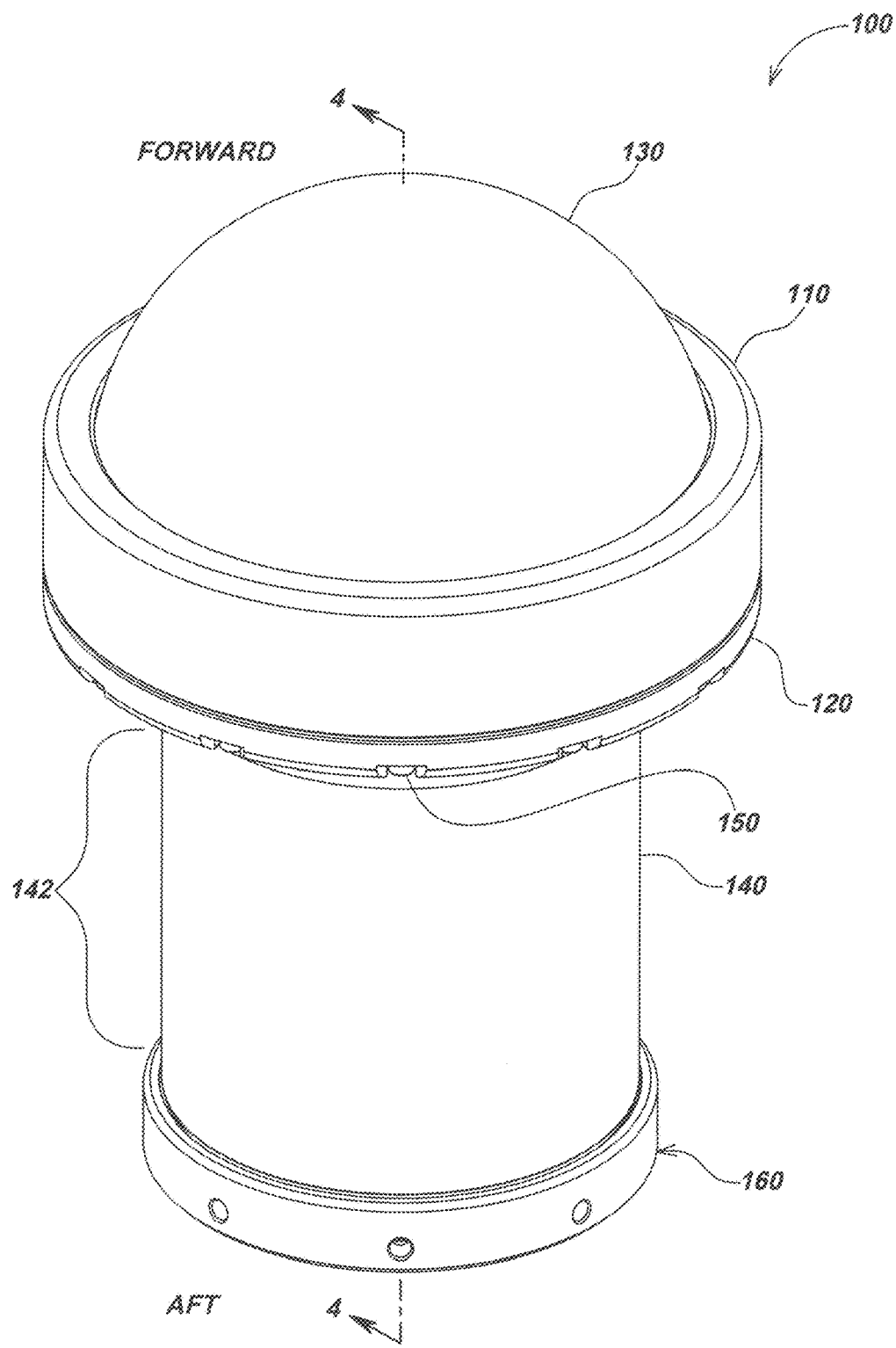
FIG. 1A illustrates details of an embodiment of a deep water optical enclosure.

The present disclosure relates generally to optical enclosures for use in deep water or other high external pressure environments. More specifically, but not exclusively, this disclosure relates to optical enclosures with enhanced strength and novel mechanical materials, combinations, and features for surviving deep water environments for housing imaging, sensors and instrumentation, and/or lighting components.

Various details of optical enclosures that may be used in additional device or system embodiments in conjunction with the disclosures herein are described in co-assigned patents and patent applications including: U.S. Pat. No. 6,697,102, issued Feb. 24, 2004, entitled BORE HOLE CAMERA WITH IMPROVED FORWARD AND SIDE VIEW ILLUMINATION; U.S. Pat. No. 7,044,623, issued May 16, 2006, entitled THRU-HULL LIGHT; U.S. patent application Ser. No. 12/844,759, filed Jul. 27, 2010, entitled SUBMERSIBLE LED LIGHT FIXTURE WITH MULTIPLE STACK FOR PRESSURE TRANSFER; U.S. Pat. No. 8,033,677, issued Oct. 11, 2011, entitled DEEP SUBMERSIBLE LIGHT WITH PRESSURE COMPENSATION; U.S. Pat. No. 8,167,468, issued May 1, 2012, entitled LED LIGHT FIXTURES WITH HEAT DISSIPATION; U.S. Pat. No. 8,172,434, issued May 8, 2012, entitled SUBMERSIBLE MULTI-COLOR LED ILLUMINATION SYSTEM; U.S. patent application Ser. No. 13/668,640, filed Nov. 5, 2012, entitled FLOTATION DEVICES FOR HIGH PRESSURE ENVIRONMENTS; U.S. Pat. No. 8,616,725, issued Dec. 31, 2013, entitled LED SPHERICAL LIGHT FIXTURES WITH ENHANCED HEAT DISSIPATION; U.S. Pat. No. 8,616,734, issued Dec. 31, 2013, entitled LED ILLUMINATION DEVICES AND METHODS; U.S. Pat. No. 8,632,230, issued Jan. 21, 2014, entitled DEEP SUBMERSIBLE LIGHT WITH PRESSURE COMPENSATION; U.S. Pat. No. 9,151,484, filed Oct. 6, 2015, entitled LED LIGHTING DEVICES AND SYSTEMS FOR MARINE AND SHORELINE ENVIRONMENTS; U.S. patent application Ser. No. 14/913,905, filed Feb. 23, 2016, entitled LED LIGHTS WITH SERVICEABLE CONNECTOR AND INTERNAL WATER BARRIER FOR DEEP WATER USE; U.S. patent application Ser. No. 15/069,953, filed Mar. 14, 2016, entitled SUBMERSIBLE LIGHT FIXTURE WITH MULTILAYER STACK FOR PRESSURE TRANSFER; U.S. Pat. No. 9,285,109, issued Mar. 15, 2016, entitled SUBMERSIBLE LIGHT FIXTURE WITH MULTILAYER STACK FOR PRESSURE TRANSFER; U.S. Pat. No. 9,316,387, issued Apr. 19, 2016, entitled LED LIGHT DEVICES WITH ENHANCED HEAT DISSIPATION; U.S. Pat. No. 9,388,973, issued Jul. 12, 2016, entitled SUBMERSIBLE LIGHTS WITH PRESSURE COMPENSATION; U.S. patent application Ser. No. 15/231,454, filed Aug. 8, 2016, entitled SEMICONDUCTOR LIGHTING DEVICES AND METHODS; U.S. Pat. No. 9,416,957, issued Aug. 16, 2016, entitled SEMICONDUCTOR LIGHTING DEVICES AND METHODS; U.S. Pat. No. 9,429,301, issued Aug. 30, 2016, entitled SEMICONDUCTOR LIGHTING DEVICES AND METHODS; U.S. patent application Ser. No. 15/362,609, filed Nov. 28, 2016, entitled LED LIGHTS FOR DEEP OCEAN USE; U.S. patent application Ser. No. 15/352,700, filed Nov. 16, 2016, entitled SEMICONDUCTOR LIGHTING DEVICES AND METHODS; U.S. Pat. No. 9,506,628, issued Nov. 29, 2016, entitled SEMICONDUCTOR LIGHTING DEVICES AND METHODS; U.S. Pat. No. 9,512,988, issued Dec. 6, 2016, entitled LED LIGHT FIXTURES WITH ENHANCED DISSIPATION; U.S. patent application Ser. No. 15/431,588, filed Feb. 13, 2017, entitled LIGHT FIXTURES WITH INTERNALLY LOADED MULTILAYER STACK FOR PRESSURE TRANSFER; U.S. Pat. No. 9,574,760, issued Feb. 21, 2017, entitled LIGHT FIXTURES WITH INTERNALLY LOADED MULTILAYER STACK FOR PRESSURE TRANSFER; U.S. Provisional Patent Application 62/515,492, filed Jun. 5, 2017, entitled DEEP WATER ENCLOSURES FOR LIGHTING AND IMAGING; U.S. Provisional Patent Application 62/545,953, filed Aug. 15, 2017, entitled UNDERWATER VIDEO HOUSING WITH LIGHT CONTAMINATION MITIGATION; U.S. Provisional Patent Application 62/561,144, filed Sep. 20, 2017, entitled UNDERWATER VIDEO HOUSING WITH LIGHT CONTAMINATION MITIGATION; U.S. patent application Ser. No. 15/797,920, filed Oct. 30, 2017, entitled PRESSURE RELIEF VALVES FOR UNDERWATER USE; and U.S. patent application Ser. No. 15/894,868, filed Feb. 12, 2018, entitled UNDERWATER LIGHTS WITH PORT WINDOWS INCLUDING LENS FEATURES FOR PROVIDING TAILORED OUTPUT BEAMS. The content of each of the above-described patent applications and patents may be referred to herein collectively as the "incorporated applications".

Traditional deep water enclosures use domes with a 180 degree angle (i.e., a half spherical shape) or, in some cases, with a much smaller angle, typically on the order of 120 degrees (which has the disadvantage of limiting the field of view out of the dome). One novel and non-obvious advantage of the present invention is that with use of glass domes having an angle of between approximately 164 degrees and 178 degrees (in an exemplary embodiment 174 degrees plus or minus 2 degrees), the dome diameter has no (e.g., at 180 degrees) to minimal (e.g., at 164 degrees) change/deflection when subjected to loading. At smaller diameters there can be significant deflection, which can adversely affect structural integrity and/or sealing of the dome to an associated housing or intermediate element such as a seating ring. However, glass domes for high pressure applications with angular measurement of 180 degrees are typically difficult to manufacture and are therefore not normally used in the art. By reducing the angular dimension of the dome to somewhat less than 180 degrees, particularly in conjunction with additional features as described below, novel and nonobvious enclosures with improved performance characteristics can be made.

When domes of less than 180 degree angular dimension are used, the dome seat may tilt/rotate (relative to a corresponding housing or intermediate seating element) depending on the angular measurement of the dome. For example, the seat of a glass dome with a 180 degree angular dimension will tilt/rotate minimally, whereas, the seat of a glass dome with an angular dimension of 164 degrees can tilt/rotate much further, causing potential fracturing, leaking, etc. starting at the mating surface. This seat rotation problem can be inventively compensated for in domes with angular dimensions of less than 180 degrees (e.g., 164-178) by addition of a compliance layer between the dome seating surface and an associated element's seating surface. Further features as described subsequently below, in conjunction with a compliance layer, may also be used.

In an exemplary embodiment, the compliance layer may comprise a material of approximately 5-10 thousands of an inch thickness of a polymer material (e.g., Kapton™ polyimide film, polyester, or other plastics). The compliance layer may be advantageously used to compensate for surface flaws at mating surfaces between enclosure elements. For example, without use of a compliance material layer between a glass dome and metal housings or intermediate elements, when subjected to high pressure (e.g., 20-30,000 PSI pressure at the interface) small surface irregularities or contaminants (e.g., dust of other particles, etc.) can cause surface fractures and inject deeper fractures into the glass material, potentially causing catastrophic implosion.

In addition, if there are slight mismatches between the glass and housing or intermediate element surface seating faces, adjoining seating sections can lock. If sections lock, even a small amount of relative displacement of a dome due to loading can cause tensile stresses to be injected into the glass, resulting in fracture initiation and potential catastrophic failure. Using a compliance layer, locking of the glass dome to housing or intermediate elements can be mitigated, and the glass dome can move slightly relative to the housing and/or intermediate elements to avoid stresses that would result in fracturing of the glass. It is noted that the compliance layer is used functionally to reduce or eliminate stresses, rather than as a sealing gasket between surfaces, although in some embodiments it can be used for both purposes.

In addition, in typical embodiments it can be desirable to lock to the compliance layer to the intermediate element (or in some embodiments the housing) mating surface so that the compliance layer material does not move when subjected to repeated pressure cycling. By creating surface locking features on the mating surface (which would normally be highly undesirable with a direct glass to metal contact due to the fracture mechanism caused by locking as described above), the compliance layer material can mechanically lock on one side to the features on the seating surface when subjected to compressive loads. This helps to limit slippage of the compliance layer relative to the intermediate element or housing, while allowing the dome to move slightly relative to the housing.

In one exemplary enclosure embodiment, a dome of approximately 174 degrees may be mated to a housing element or intermediate element, such as an annular seating or support ring, with a compliance material in between, and the mating surface/seat of the housing or seating mating surface may be etched or otherwise processed to include small roughness features such as structures, embossing, etching, and the like to lock or retain the compliance layer material to the metal during loading induced deflections/movements caused by repeated pressurization and depressurization cycles.

In one exemplary embodiment, an annular seating ring (e.g., of a 17-4 stainless steel with a 35 million PSI Young's modulus or a material with similar properties) may be positioned between a glass dome having an angular measurement of approximately 174 degrees (e.g., a glass dome of a glass material having a 10 million PSI modulus) and a housing (e.g., of a titanium material having a 16.5 million PSI modulus). The seating ring may be stepped or otherwise shaped to distribute pressure substantially uniformly across the annulus during loading to avoid failure of the compliance material when the dome tilts (i.e., depending on the angular measurement, the dome may tilt during loading such that the inner side of the seating surface applies significantly more pressure to the compliance material than the outer side, which can result in crushing/mashing of the compliance material and failure due to stress fracturing in the glass).

Applied pressure to the compliance material layer (e.g., typically rated on the order of 30,000 PSI before failure, whereas the glass and metallic materials can withstand 100,000 PSI or more before failure) may be controlled through careful shaping and configuration of the interface surfaces and associated structure so that pressure across the seating interface is distributed approximately uniformly, and so that there are no high pressure points or areas at the seating interface when the dome, housing, and intermediate seating ring are loaded. Matching thermal expansion coefficients in the material (e.g., by being within a preselected tolerance such as 1 percent, five percent, 10 percent, etc.) can also be used to minimize thermally induced differences in stresses due to unequal expansion or contraction of different elements (e.g., when going from ocean surface temperatures of 70-80 degrees Fahrenheit to deep water temperatures of 40 degrees or lower).

In various embodiments, deep water submersible optical enclosures in accordance with the present disclosure may include a transparent pressure bearing dome window, also referred to herein as "optical dome" or "optical dome window" or "dome" or "window" or "dome window," which may be seated onto a housing having a hollow interior, with an intermediary dome support ring (also denoted as a "seating ring" or "support ring" for brevity) positioned between the housing and optical dome window. Novel shapes, materials, and boundary features may be used for the window, support ring, and pressure housing.

The enclosure may be used to house various equipment, including sensors, batteries or other power supplies, imaging, and/or lighting/illumination devices for lighting, viewing, sensing, and/or recording information, images, and/or video at a work area, such as in the deep ocean. Typical work areas are deep ocean environments at or below 1,000 meters; however, other embodiments may be used in alternate application where the enclosure is subject to high external ambient pressure, such as in a deep well, a pressurized container or other intentionally pressurized environment, and the like.

The dome support ring may have opposite annular faces that are substantially planar and parallel, and may be polished or otherwise smoothed to provide a highly smoothed surface. The dome support ring may have regions of different radial thickness to compensate for loading/stress variations. For example, thickness may be varied such that a region closest to the dome window may be of a material and shape that closely resembles the radial stiffness of the dome window, and such that the different regions are proportioned to provide matched displacements to that of corresponding areas of the dome window under a large hydrostatic load (e.g., due to high external ambient pressure applied to the external surface of the dome window). Embodiment of optical enclosures described herein may further include one or more coupling elements that join and secure together the housing and dome window with a dome support transition element secured therebetween.

In another aspect, the enclosure housing may have an inward sloped section to accommodate displacements of the dome and dome support ring due to movement/rotation of the dome and/or other support ring under hydrostatic load.

In another aspect, the enclosure may include a compliance film positioned between the dome window and dome support ring. The compliance film may comprise a material having a lower Young's modulus value than either that of the window or dome support ring. The dome support ring may also be textured, such as with small or micro-sized surface features, along the surface interfacing the compliance film layer to aid in locking the compliance film in place when subjected to loading from pressurization of the dome window, housing, and/or support ring. The surface may be shaped with repeated raised and lowered features for locking, due to friction, the compliance layer with the dome support ring.

In another aspect, the shape and geometry of the dome window and dome support ring may be configured to allow for substantial uniformity of pressure at the seat of the dome window and avoid high pressure areas that could move or damage the compliance material. By providing substantial uniformity of pressure at the dome window seat, the compliance film may be further prevented from moving or otherwise becoming displaced, or being destroyed, during extreme loading applied to the window, support ring, and or housing caused by high external pressure.

In another aspect, the optical dome window may be processed for strengthening to provide further structural integrity and durability. Strengthening of the optical dome window may be done by, for example, mechanical polishing, hydrofluoric or other acid etching, flame polishing, photolithographic etching, ion exchange or other chemical strengthening, or other methods known or developed in the art.

In another aspect, the optical dome window may have chamfered edges along the seat surface on the interior and/or exterior sides.

In another aspect, the dome window and dome support ring may be shaped such that if a mutual contact region of either element is loaded by a hydrostatic pressure of equivalent total force, each independent of the influence of the other, it would move, rotate, and otherwise displace in a complementary manner.

In another aspect, the dome window may have a cross-sectional arc measurement modeled to allow matched displacement of the window seat and housing seat areas under a high hydrostatic load. In an exemplary embodiment, the dome window may have a cross-sectional arc angle of about 174 degrees. Other embodiments may use cross sectional arc angles of between approximately 164 degrees and approximately 180 degrees.

Various additional aspects, details, features, and functions are described below in conjunction with the appended figures.

The following exemplary embodiments are provided for the purpose of illustrating examples of various aspects, details, and functions of apparatus and systems; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

EXAMPLE EMBODIMENTS

Existing optical enclosures for deep water applications, such as deep ocean exploration, mining, oil drilling, and the like fail to compensate for differential displacement and rotation type movements of optical dome windows relative to their housings due to mismatched material properties under hydrostatic load as well as temperature variances and other stresses experienced in deep water environments. Difference in Poisson's ratio, modulus, coefficient of thermal expansion, and other properties of window and housing materials may result in differential movements of the window relative to the adjoined housing in deep water environments. Likewise, hydrostatic pressure on a dome window may result in a rotational type movement of the dome relative to the seat on the housing. Such differential movements of a window relative to an associated housing may shift the areas of contact bearing the load between housing and window, ultimately resulting in breakage and failure of the window and catastrophic implosion of the enclosure at depth. Various embodiments described herein address these deficiencies as well as others by providing improved optical enclosures for deep water/high pressure use.

FIG. 1A illustrates one embodiment of a deep water optical enclosure 100 in accordance with certain aspects. Optical enclosure 100 may include a dome bezel 110 which may secure to a dome bezel retainer 120 which positions and indirectly holds an optical dome window 130 to a cylindrical structural housing 140. In other embodiments, other geometries and/or attachment mechanisms may secure the optical dome and dome support ring in place relative to a housing in addition to or in place of the dome bezel 110 and dome bezel retainer 120 as illustrated in FIG. 1A.

Figure 2:
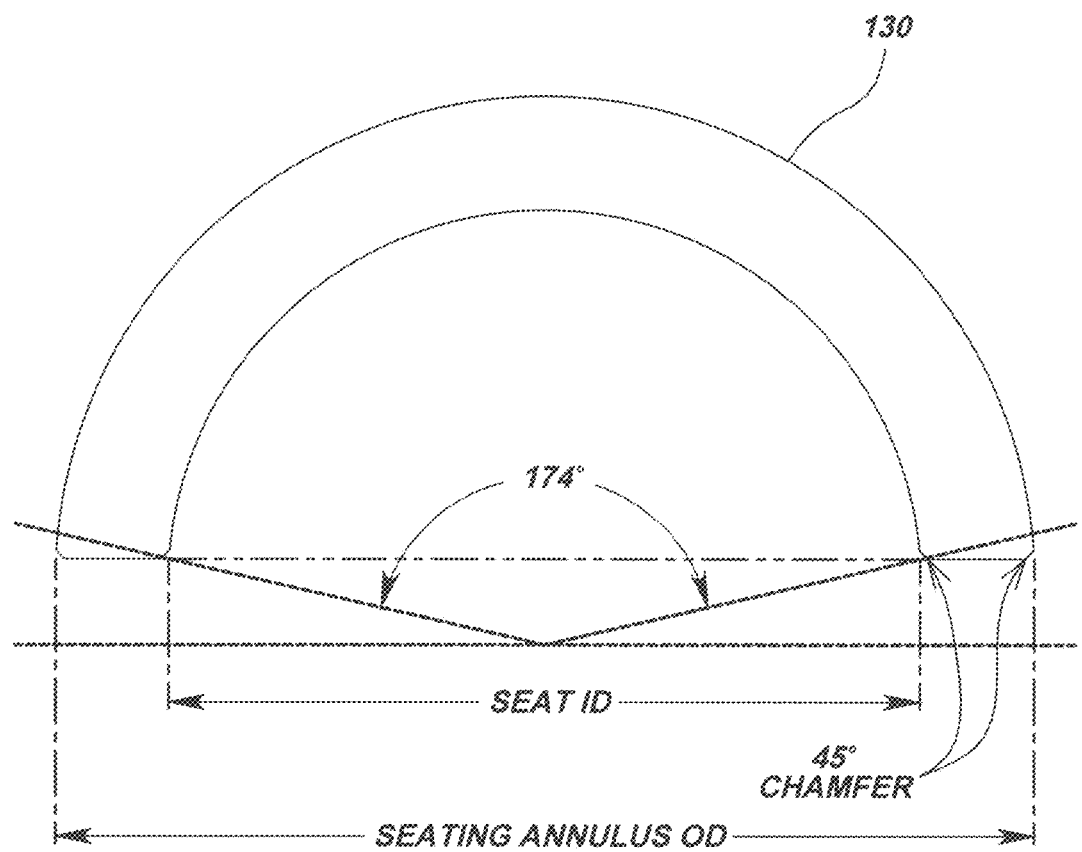
FIG. 2 illustrates an embodiment of a dome window.

In optical enclosure embodiments described herein, the optical dome, such as optical dome 130 of FIGS. 1A and 2, may be a substantially dome shaped window that is a planarly trimmed or truncated portion of a hemisphere. Optical domes, being a planarly truncated portion of a hemisphere, may have a cross-sectional arc measurement or dimension defined as the measure of the arc segment formed along the inner surface of the optical dome on a plane bisecting the optical dome, wherein the arc segment is bounded by the truncation of the hemisphere on either end of the arc on the cross-section.

In the optical enclosure embodiment 100, the optical dome 130 may be a glass dome with a cross-sectional arc measurement of 174 degrees as illustrated in further detail in FIG. 2. Optical dome 130 may have a seat inner diameter (also referred to herein as "seat ID" or "ID" for brevity) measuring 106 mm, and a seating or support annulus outer diameter (also referred to herein as "seating or support annulus OD" or "OD" for brevity) measuring 138 mm. In other embodiments, different measurements for the seat ID and seating annulus OD may be used, resulting in different thickness of glass or other dome materials.

Difference in seat ID and seating annulus OD may require alterations in dome support ring geometries and/or materials so that the dome support ring and optical dome have substantially matching or otherwise complementary movements and displacements of corresponding contact regions thereof under hydrostatic load.

The glass optical dome 130, as well as other dome embodiments, may be strengthened by various strengthening processes. As used herein the term "strengthened glass" or "strengthened" as relating to glass or other dome materials refers to any process or method that is used to enhance the strength of glass or other optical dome materials. Strengthening processes or methods may include, but are not limited to, mechanical polishing, hydrofluoric or other acid etching, flame polishing, ion exchange or other chemical strengthening, or other like methods.

Figure 3:
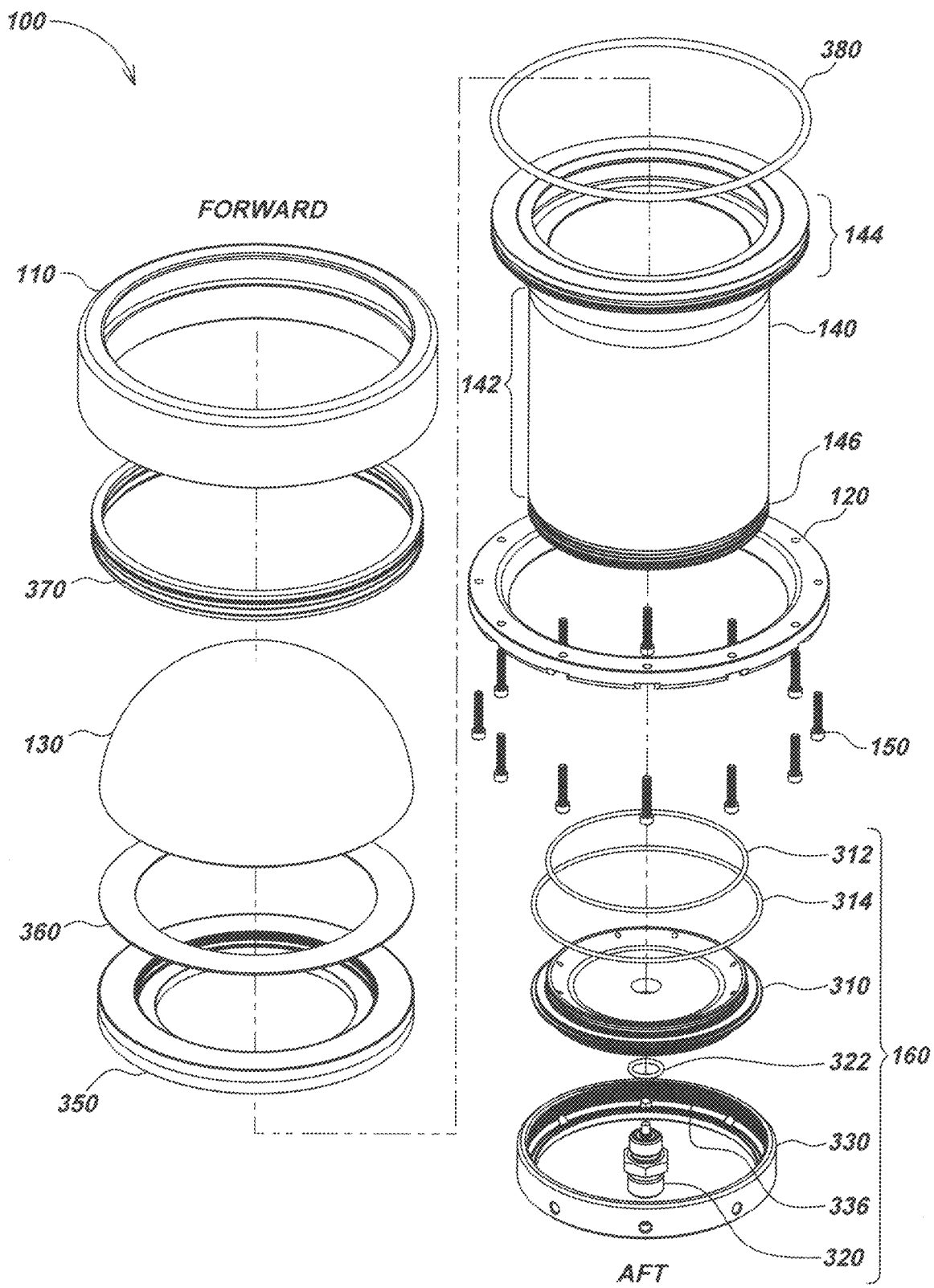
FIG. 3 illustrates an exploded view of details of the optical enclosure embodiment of FIG. 1A.
Figure 4:
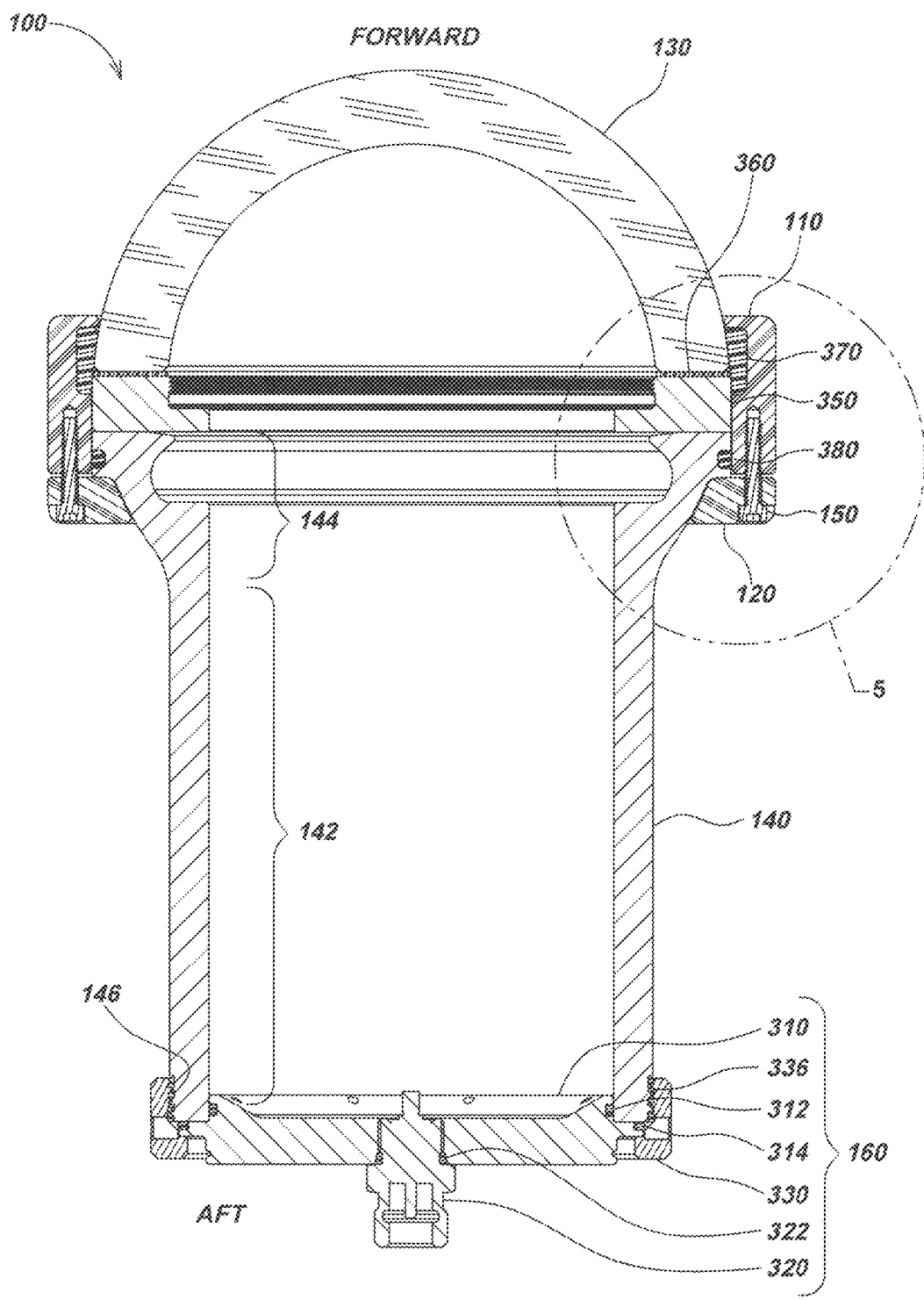
FIG. 4 illustrates a section view of details of the optical enclosure embodiment of FIG. 1A along line 4-4.
Figure 5:
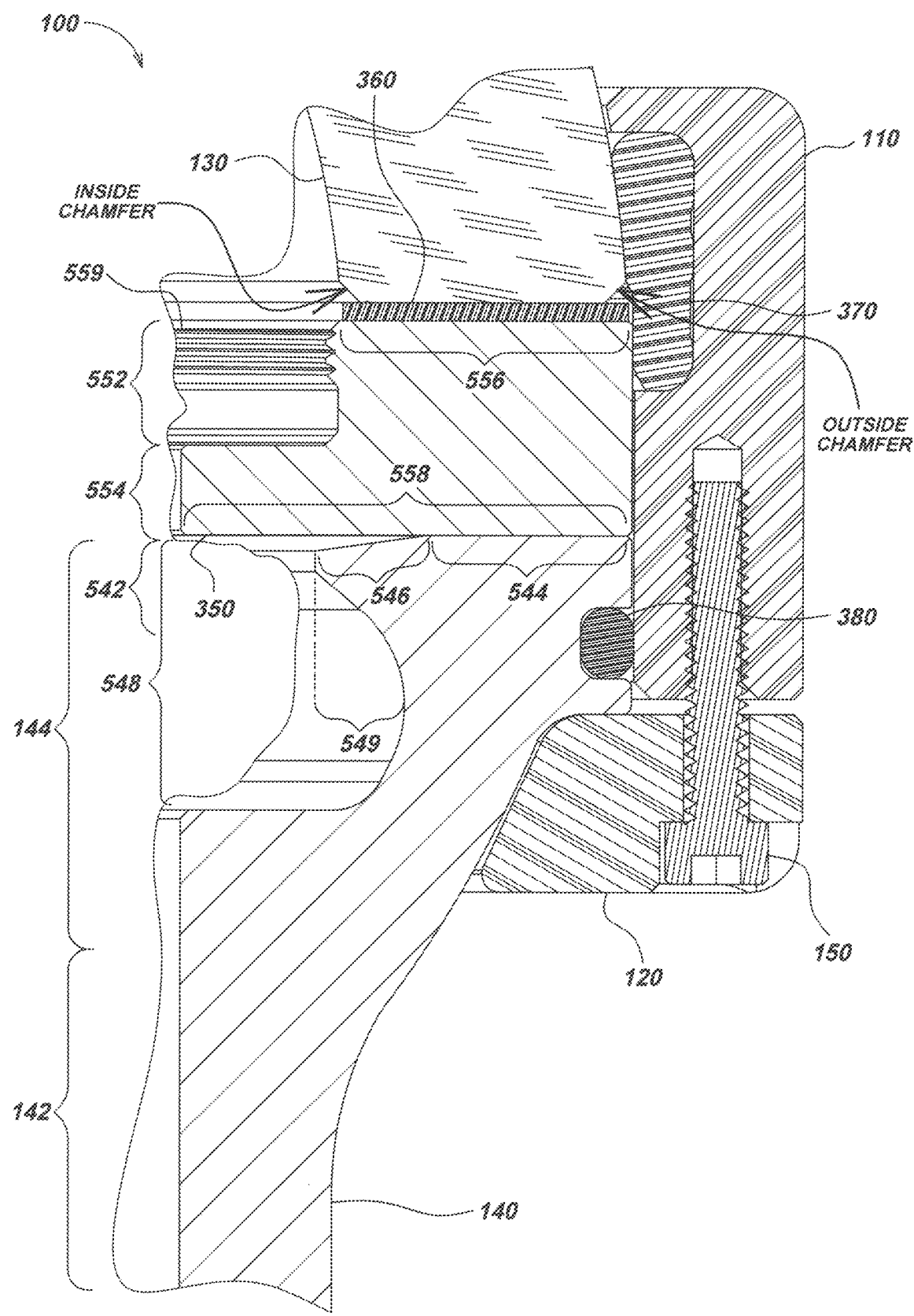
FIG. 5 illustrates a section view of section 5 of the embodiment of FIG. 4.

The glass optical dome 130, as well as other dome embodiments, may further include chamfered edges as illustrated in FIG. 2 and FIG. 5. As described subsequently herein, the cross-sectional arc measurement (e.g., 174 degrees in one embodiment) may be chosen so that the optical dome 130 has a radial stiffness similar to that of a corresponding area on dome support or seating ring 350 (as shown in FIGS. 3-5) on which dome 130 is seated, allowing the optical dome 130 to have matched displacements with dome support ring 350 under hydrostatic load.

In other embodiments, optical domes may be made of other high strength transparent or partially transparent material, such as acrylic, sapphire, or the like for providing optical clarity for the passage of light, as well as mechanical strength, such as for example, resistance to external pressure required for deep ocean applications. Exemplary optical dome embodiments may have a cross-sectional arc measurement of between approximately 160 and 178 degrees so that the dome has a radial stiffness closely matched to the radial stiffness of the corresponding dome support ring.

Unlike typical optical enclosures having dome windows where the cross-sectional arc measurement is chosen such that the geometry is modeled to prevent inward and outward deflections of the window under hydrostatic load, the cross-sectional arc measurement of optical domes disclosed herein may be chosen to allow matched displacements of the optical dome to the dome support ring under hydrostatic load rather than to minimize deflections under load.

Referring still to FIG. 1A, the housing 140 may be made of 6AL4V titanium. In other embodiments, the housing may be steel, other metal alloys, or like high tensile strength and high durability materials such as high strength plastics. The housing 140 may have a cylindrical housing body 142 (FIG. 5) and a housing neck 144 (FIG. 5) formed to extend radially outward along the forward end of the housing 140 nearest dome 130.

The dome bezel retainer 120 may be shaped to have a smaller internal diameter than the outermost diameter of the housing neck 144 (FIGS. 3-5) of housing 140 such that the dome bezel retainer 120 seats along housing neck 144. Likewise, the dome bezel 110 may be sized with a smaller internal diameter than the outermost diameter of the optical dome 130 so that when the dome bezel retainer 120 secures to dome bezel 110 via screws 150, optical dome 130 may secure (indirectly as illustrated in FIGS. 3-5) to housing 140.

Figure 1B:
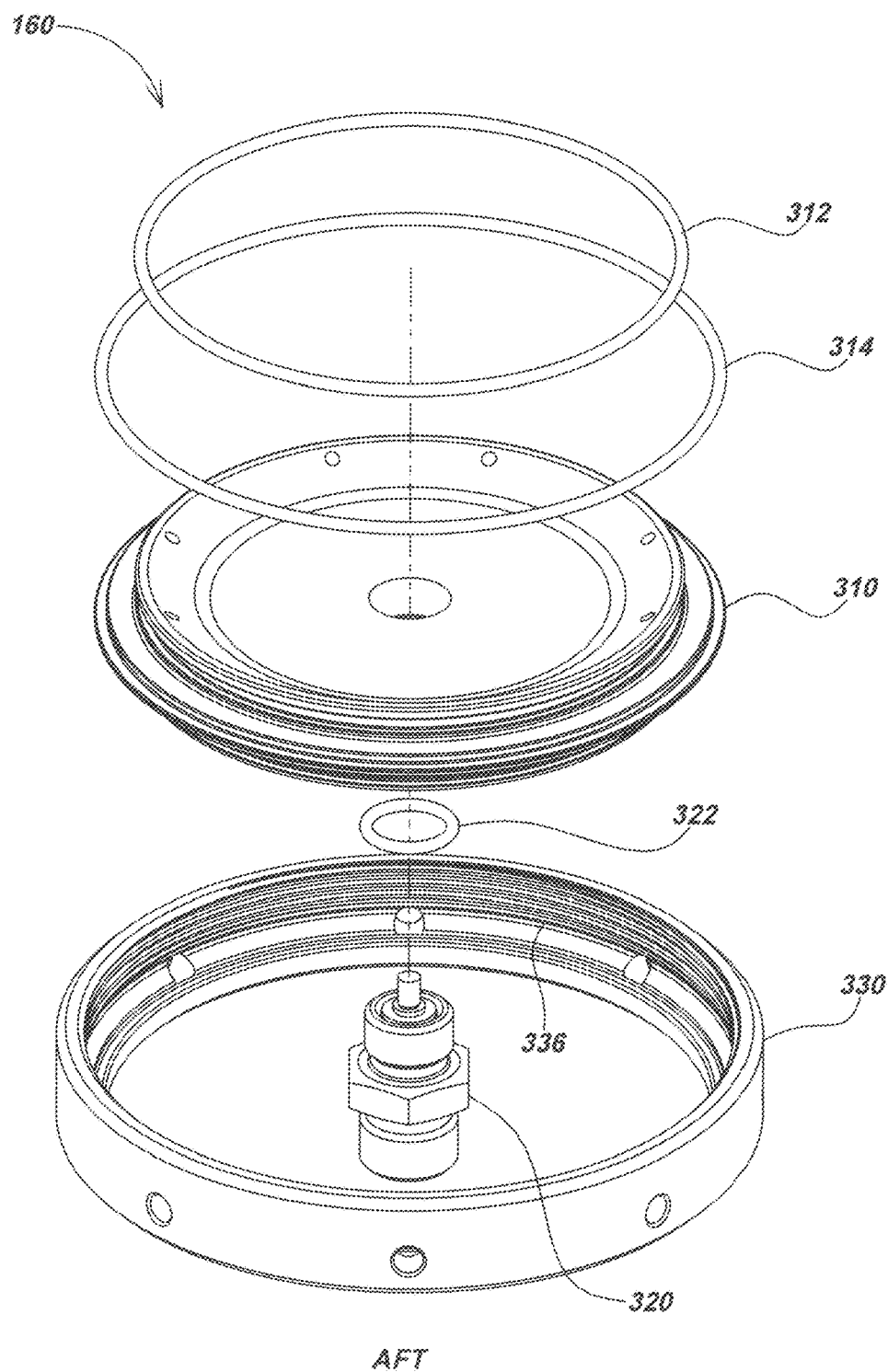
FIG. 1B illustrates an endcap assembly of the embodiment of FIG. 1A.

An endcap assembly 160, illustrated in detail in FIG. 1B, may be disposed on the base of housing 140 (as shown in FIG. 1A) to allow the passage of power and/or data signals to electronic devices (e.g., LED lights, image or still cameras, etc.) in the optical enclosure 100 (e.g. camera 710 illustrated in FIG. 7), while expanding across the aft aperture of housing 140 and prevent ingress of water. As further illustrated in FIG. 1B, the endcap assembly 160 may include an endcap 310 into which a connector 320 may fit, and an endcap retainer 330 to further secure the endcap assembly 160 to housing 140 (FIG. 1A). A series of O-rings 312, 314, and 322 may seat between the various endcap assembly 160 components preventing the ingress of water.

As further illustrated in FIGS. 3 and 4, the endcap 310 may be dimensioned to fit onto and, when used in combination with the various O-rings 312 and 314 as well as connector 320 and O-ring 322 and endcap retainer 330, may seal the rear aperture of housing 140 opposite the optical dome 130. The endcap 310 may seat onto the bottom of housing 140 and be held thereto via endcap retainer 330 via threads on endcap retainer 330 dimensioned to mate with threads formed on housing 140. O-rings 312 and 314 may seat between endcap 310 and housing 140 and be held therein via threads 336 formed on endcap retainer 330 mating with threads 146 formed on housing 140. The O-rings 312 and 314 may prevent ingress of water between housing 140 and endcap 310.

A hole may be formed through endcap 310 and dimensioned to allow the connector 320 to seat snugly therein. O-ring 322 may seat between endcap 310 and connector 320 to prevent water from entering into optical enclosure 100. The connector 320 may allow power and/or data signals between equipment within optical enclosure 100 to equipment external to optical enclosure 100. For instance, an optical enclosure embodiment may house a RF antenna and/or a camera and/or illumination component, such as camera 710 disposed within optical enclosure 700 of FIG. 7, for recording or illuminating a deep ocean environment or other work area. As further illustrated in FIG. 7, optical enclosure 700 may seat or coupled to a remotely operated underwater vehicle (ROV) 720 so that ROV 720 may transfer electrical power and exchange data signals (which may include signals associated with controlling lights and recording imagery of the work environment) with camera 710. The passage of electrical power and data signals between camera 710 and ROV 720 may be implemented with an electrical connector, such as the connector 320 of FIGS. 3 and 4, positioned there between.

As further illustrated in FIGS. 3 and 4, the dome bezel 110 may secure to the dome bezel retainer 120 via screws 150 holding dome 130 to housing 140 with a dome support ring 350 and compliance material layer 360 seated there between. The materials and geometry of the dome support ring 350 may be selected to match movements the optical dome 130 under hydrostatic load as further described herein with FIG. 5. It is noted that the materials and geometry of the optical dome 130 and dome support ring 350 may be selected to allow for substantially matching or otherwise complementary movements and displacements of both contact regions of the optical dome 130 and dome support ring 350, independent of the influence of the other, given a hydrostatic pressure of equivalent total force.

The dome support ring may be a heat treated 17-4 stainless steel. In other embodiments, ceramic or other materials and alloys may alternately be used. The particular geometry of a dome support ring may vary based on the material used. For example, in alternate embodiments, regions may have different radial thicknesses, and the regions of different radial thickness may have a different radial thickness and/or height selected to compensate for the different physical properties of the dome support ring materials, as well as to provide a radial stiffness match to the dome window and matched rotation type movement under hydrostatic load.

In typical embodiments, the geometry of the optical dome and dome support ring, such as the optical dome 130 and dome support ring 350 of FIGS. 3 and 4, are selected to allow for substantial uniformity of pressure at the seat of the optical dome to avoid movement and/or damage to the compliance layer.

By selecting the material and shaping to provide substantial uniformity of pressure at the seat of the optical dome, the compliance film, such as compliance film 360, may be prevented from moving or otherwise becoming displaced or damaged. In operation, the compliance film 360 may compensate for imperfections in seating surfaces on the dome 130 and dome support ring to allow movement of the dome relative to the housing and/or support ring.

An annular dome seal 370 may also be disposed between dome bezel 110 and dome 130/dome support ring 350 to provide a soft compliant surface against optical dome 130 that may aid in preventing point loading against the surface thereof as well as seal gaps between the dome bezel 110, dome 130, and dome support ring 350 and prevent water from entering optical enclosure 100. The compliance film 360 may be polyimide, polyetherimide, polyester, or like materials for compensating for imperfections or foreign particulate on seating surfaces to avoid point fractures as described previously herein. The annular dome seal 370 may be ethylene propylene diene rubber (EPDM), acrylonitrilebutadiene (NBR), or other elastomer material. One or more additional O-rings, such as O-ring 380, may be positioned between dome bezel 110 and housing 140 to further prevent water ingress.

Some dome support ring embodiments may have a textured seating surface into which the compliance material layer (e.g., compliance film 360) locks during use. The compliance layer may be pressed to the support ring during manufacture to prevent movement of the compliance film relative to the dome support ring, and in operation, when subjected to high external pressure, may be further pressed in place for friction retention.

Figure 6A:
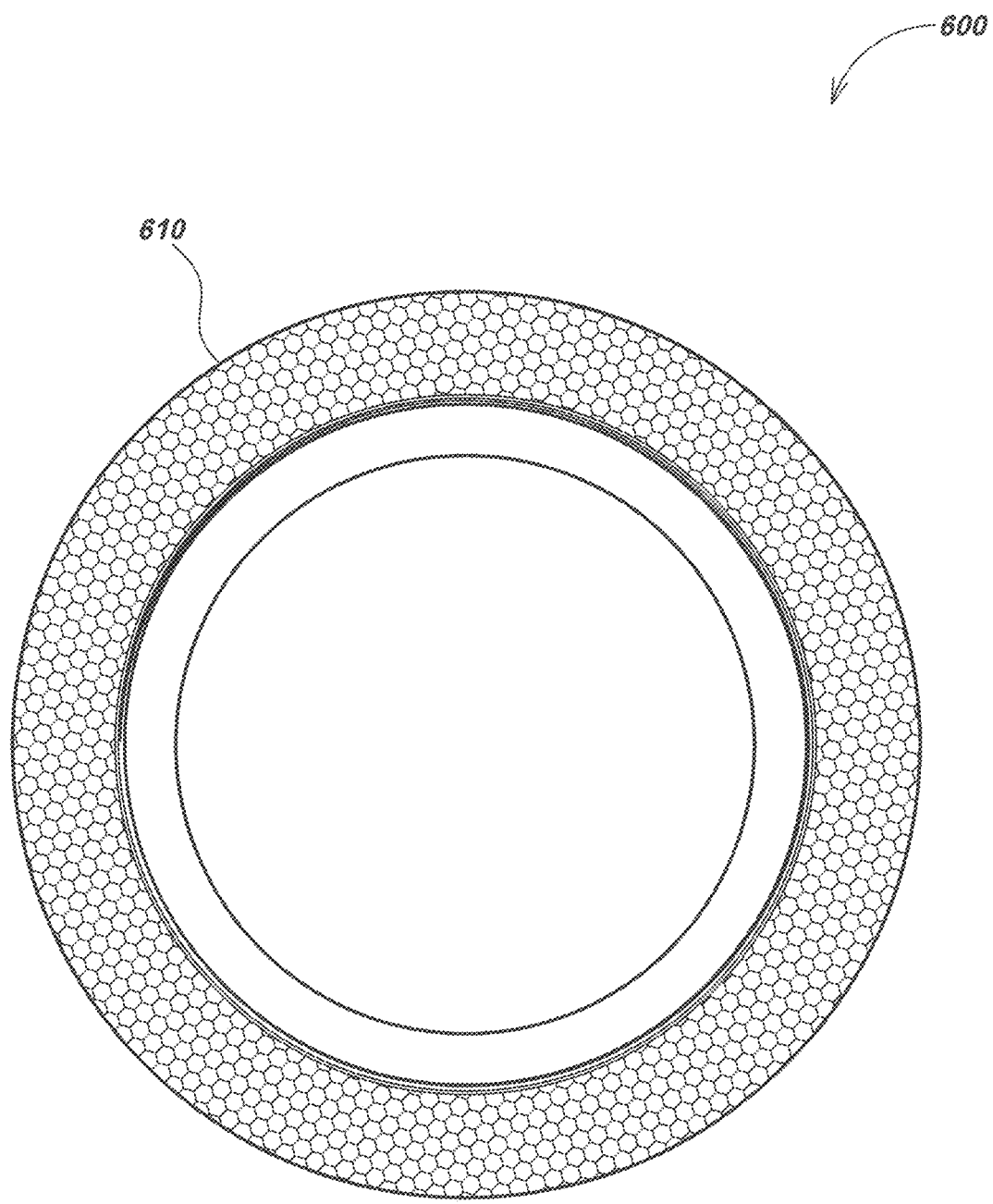
FIG. 6A illustrates details of an embodiment of a dome support ring with a textured seat surface.

Dome support ring 600 of FIG. 6A, for example, illustrates an example textured seating surface 610 to prevent movements of a compliance film layer during movements of an optical dome when under load. The textured seating surface 610 may be created through various techniques in dome support ring 600, such as, for example laser etching or micro-machining. In other embodiments, sanding and/or other techniques may be used to form the textured seating surface. The dome support ring 600 may be the same or similar to dome support ring 350 of FIGS. 3-5 or other dome support rings as disclosed herein, or their equivalents.

Figure 6B:
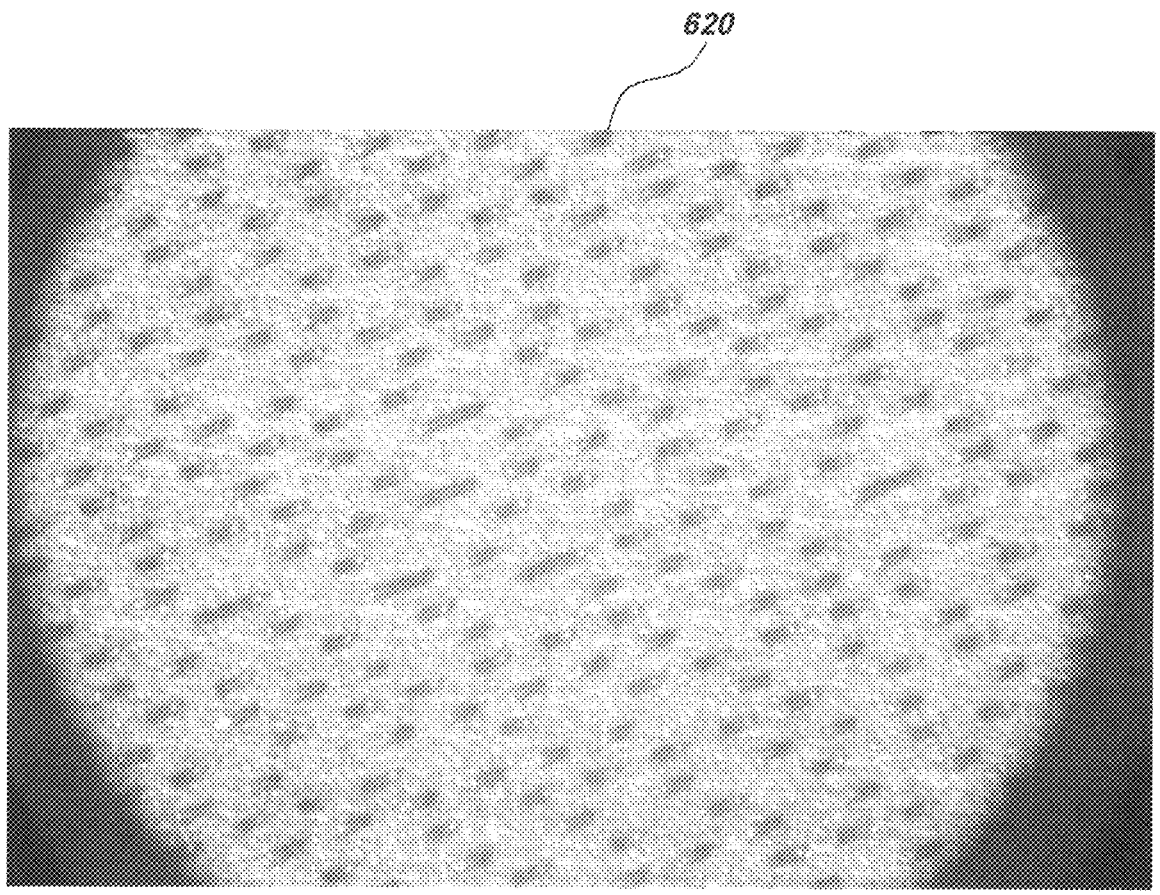
FIG. 6B is a photograph of the textured seat surface of the embodiment of FIG. 6A under forty-five (45) times magnification.

Turning to FIG. 6B, a textured seat surface 620 under forty-five times magnification is shown. This may be the same or similar to the textured seat surface 610 of FIG. 6A or texturing features on the seat surface of other dome support ring embodiments. The textured seat surface 620 shown in FIG. 6B includes multiple divot markings creating the texture. In other embodiments, other shapes and patterns may be used to texture the seat surface, and these may be formed at different lengths, widths, and/or depths on the mating surface.

Returning to FIG. 5, dome support ring 350 may have a first dome support tuning region 552 interfacing the optical dome 130 of lesser diameter than a second dome support tuning region 554 interfacing housing 140. The varying regions of radial thickness on dome support ring 350 (e.g., first dome support tuning region 552 and second dome support tuning region 554) may be tuned to provide matched displacements type movements of the dome 130 under hydrostatic load and move.

For example, under external hydrostatic load, optical dome 130 may be forced to compress inward, causing inward displacements and rotations of the annular seat area of dome 130. Under the same hydrostatic load, the radial thickness of first dome support tuning region 552 and second dome support tuning region 554 may be selected to provide the same radial and rotation type of movement matching the dome 130.

A compliance film interface surface of the dome support 556 on the forward most side of the first dome support tuning region 552 of dome support ring 350 may be textured with features as previously described to prevent movements of compliance film 360. The radial thickness of compliance film interface surface of the dome support 556 and a first dome support tuning region 552 may be dimensioned such that the annular seat area on the optical dome 130 is supported fully by the dome support ring 350, and such that the radial stiffness of first dome support tuning region 552 may closely match that of optical dome 130.

A housing interface surface of the dome support 558 on the aft most side of the second dome support tuning region 554 of dome support ring 350 may contact a first housing tuning region 542. The first housing tuning region 542 may include a dome support interface surface of the housing 544 and an inwardly aft sloped second housing tuning region 546. Under hydrostatic load causing rotation type movements of optical dome 130 and dome support ring 350, the second housing tuning region 546 in combination with an third housing tuning region 548 formed along the inside of the housing neck 144 of housing 140 may allow the dome support ring 350 to rotate relative to the housing 140 while still transferring load to housing 140.

An undercut section 549 on the third housing tuning region 548 of housing 140 may be formed to reduce the rotational stiffness of the housing 140 underneath and supporting the dome support ring 350 allowing the housing 140 to match and follow the rotation of the seat of the optical dome 130 under hydrostatic pressure loading. The undercut section 549 in combination with the radial offset of the stepped regions of the dome support ring 350 (e.g., the shifted outward first dome support tuning region 552 supporting the optical dome 130 and the second dome support tuning region 554 contacting housing 140) may allow the dome support ring 350 to respond to radial external pressure on optical enclosure 100 and have the dome support ring 350 rotate with the seating area of the optical dome 130. It is further noted that the optical dome 130 and dome support ring 350 are shaped of materials of particular dimensions of one possible combination of materials that if the mutual contact regions of either optical dome 130 or dome support ring 350 were loaded instead by a hydrostatic pressure of equivalent total force, each independent of the influence of other, would move, rotate, and otherwise be displaced in substantially complementary manner.

In matching rotations and other displacements between optical domes and dome support rings in various enclosure embodiments, such the optical dome 100 and some support ring 350 of FIGS. 1A-5, under use conditions of pressure and temperature, the stresses and failures of optical enclosures used under such conditions may be mitigated. For example, by matching rotations and other displacements between optical domes and dome support rings tensile stresses within the seating area of the optical dome may be reduced. By reducing such stresses, particularly those imparted onto glass or other brittle fracture materials, formation of cracks within the optical dome at the seating surface that may otherwise arise during high pressure loading may be mitigated.

The dimensions, geometries, and specific materials used may impact the interaction between component elements (e.g., optical dome and dome support ring as well as dome support ring and housing) and further impact the optical enclosure's ability to compensate for material and mechanical mismatches. In an optical enclosure embodiment in accordance with the present disclosure, a change in such attributes within one component may be compensated for in corresponding changes in attributes of one or more other components. For example, in an alternative embodiment having an optical dome of different cross-sectional arc measurement and/or different materials resulting in the optical dome having an increased or decreased radial stiffness compared to the optical enclosure 100 of FIGS. 1A-5, the dimensions of the first dome support tuning region on the dome support ring may be altered to match the radial stiffness of the optical dome. Likewise, in embodiments with an optical dome having a differing degree of rotation type movements under hydrostatic load (e.g., through a difference in optical dome materials, thickness of materials, or the like), dimensions of first and second dome support tuning regions of the dome support ring and slope of the support ring interface rotation seat surface and dimensions or geometry of the third housing tuning region of the housing may be altered to compensate for the degree of rotation with the optical dome.

As further illustrated in FIG. 5, a series of dome support threads 559 may optionally be included on optical dome support ring 350 to allow mounting of camera or other optics within optical enclosure 100. In other embodiments, other techniques may be used to mount optics which may further be mounted to housing or other locations within an optical enclosure in keeping with the present disclosure. In embodiments having threads formed on the dome support ring, such as the dome support ring 350 of FIG. 5, such threads and mounting optics may be factored into radial stiffness and rotation calculation to determine materials, geometry, and radial thickness of dome support regions.

Figure 7:
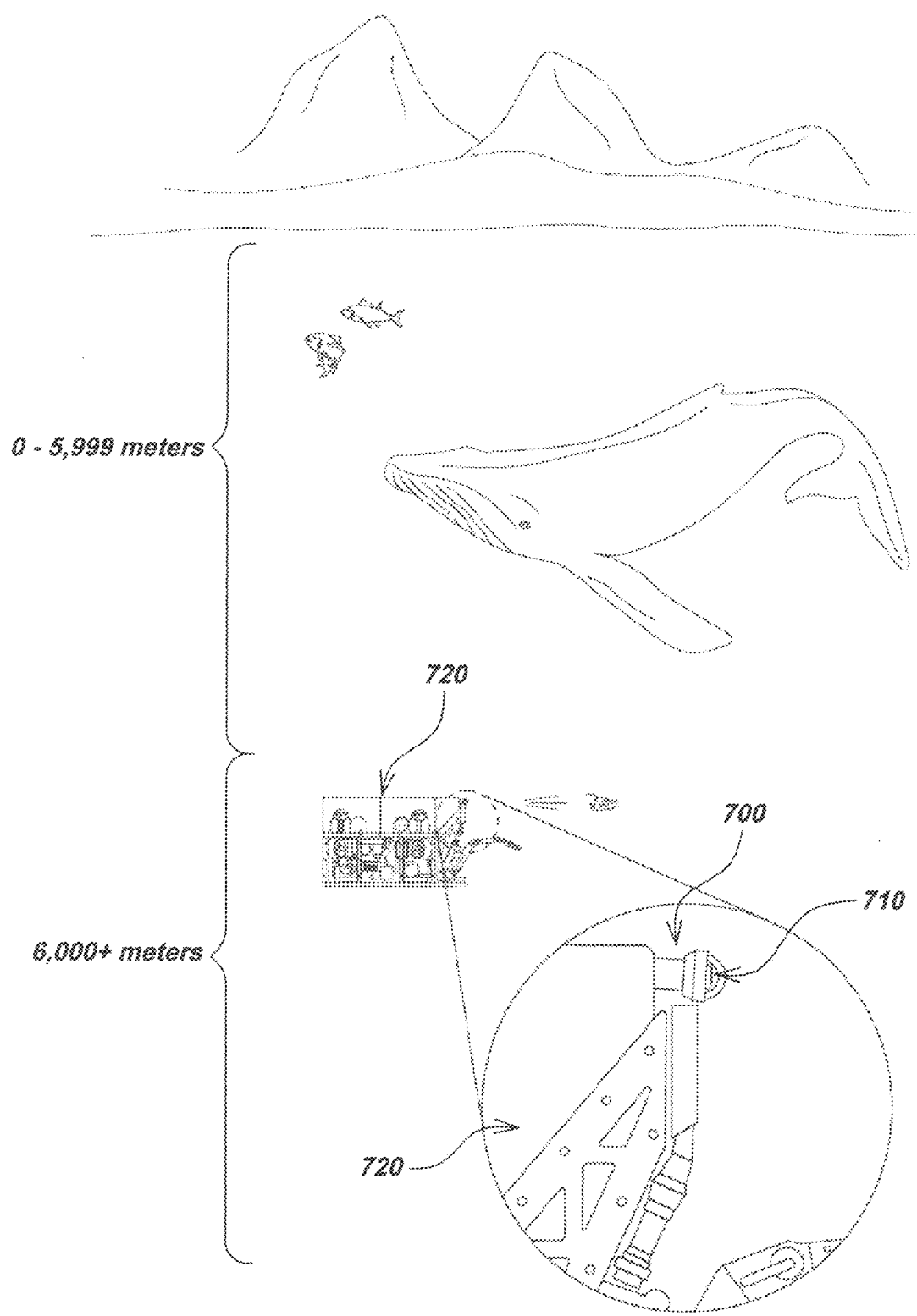
FIG. 7 illustrates details of an embodiment of an optical enclosure on a remotely operated underwater vehicle (ROV) in a deep ocean environment.

FIG. 7 illustrates some example applications of an enclosure in accordance with the present disclosure. As shown in FIG. 7, an optical enclosure 700, which may be or share aspects of the embodiments described in FIGS. 1A-5, may house a camera 710 and/or lighting elements (e.g., LEDs or other light output devices) for recording and illuminating a deep ocean environment or other work area subject to high external pressures. Enclosure 700 may be coupled to a cable or tether, may be held by or mounted on a user (at relatively shallow depths where humans can operate underwater), or may be mounted on a vehicle or structure. For example, as shown in FIG. 7, optical enclosure 700 may be mounted on a remotely operated underwater vehicle (ROV) 720. In typical ROV applications, the ROV 720 may transfer electrical power and exchange data (typically data associated with controlling lighting, camera operation, environmental sensing, and/or recording and transferring images or video of the work environment) with camera 710 to view and/or record images, video, sensor, or other information in the deep ocean work environment.

Figure 8:
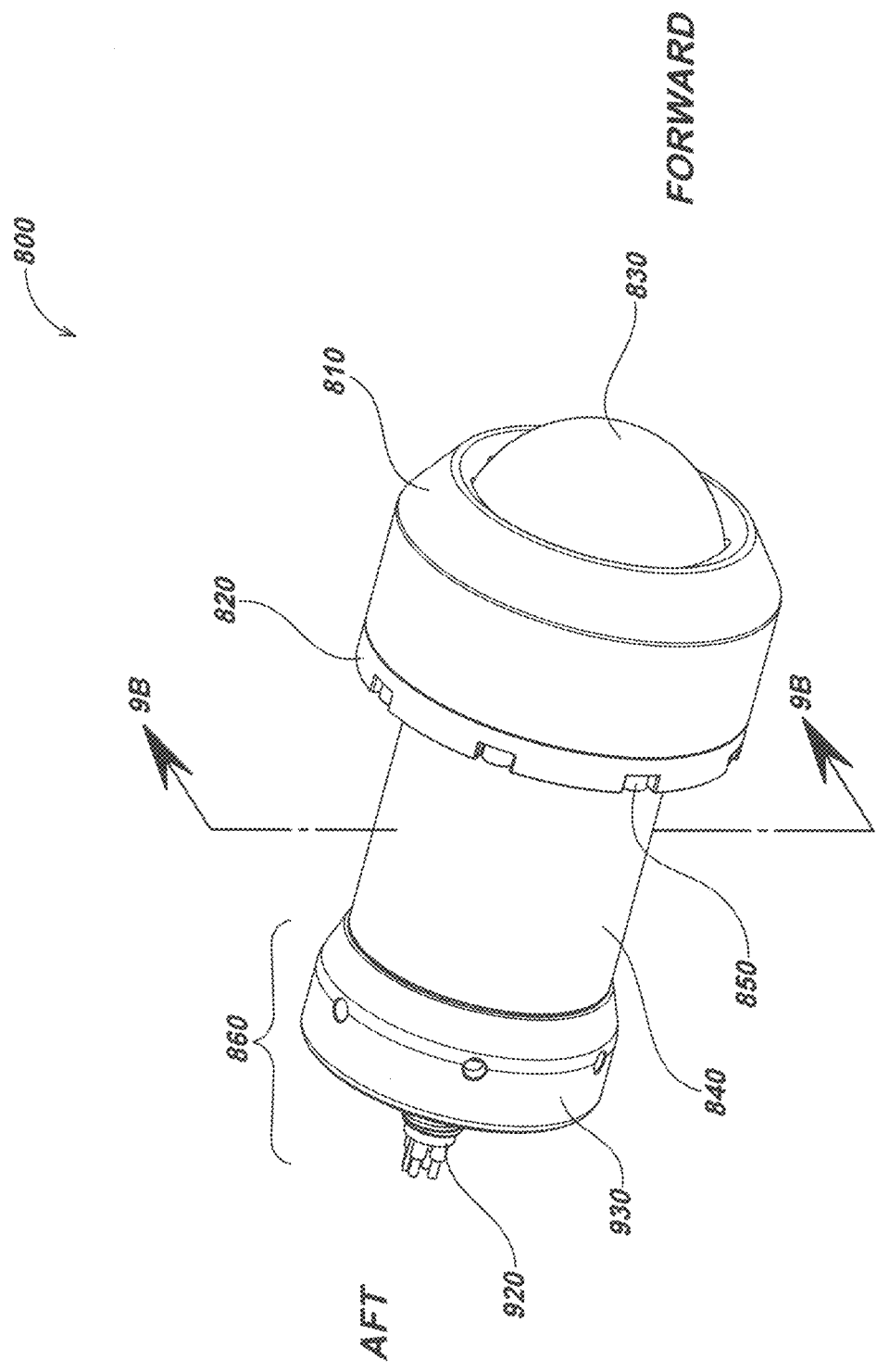
FIG. 8 illustrates details of another embodiment of a deep water optical enclosure.

FIG. 8 illustrates one embodiment of a deep water optical enclosure 800 in accordance with certain aspects. Optical enclosure 800 may include a dome bezel 810 which may secure to a dome bezel retainer 820 which positions and indirectly holds an optical dome window 830 to a cylindrical structural housing 840. In other embodiments, other geometries and/or attachment mechanisms may secure the optical dome and dome support ring in place relative to a housing in addition to or in place of the dome bezel 810 and dome bezel retainer 820 as illustrated in FIG. 8.

The optical dome 830 may be a substantially dome shaped window that is a planarly trimmed or truncated portion of a hemisphere. Optical dome 830, being a planarly truncated portion of a hemisphere, may have a cross-sectional arc measurement or dimension defined as the measure of the arc segment formed along the inner surface of the optical dome 830 on a plane bisecting the optical dome 830, wherein the arc segment is bounded by the truncation of the hemisphere on either end of the arc on the cross-section. The optical dome 830 may have a cross-sectional arc measurement of 174 degrees. Optical dome 830 may further have a seat ID measuring 64 millimeters, and a seating or support annulus OD measuring 83 millimeters. The seat ID and seating annulus OD of optical dome 830 may be selected such that the geometries and/or materials of the optical dome 830 and a dome seat ring 950 (FIGS. 9A and 9B) and a pivot housing ring 970 (FIGS. 9A and 9B) onto which it may be seated have substantially matching or otherwise complementary movements and displacements of corresponding contact regions thereof under hydrostatic load.

The optical dome 830 may be manufactured from a glass material, preferentially borosilicate glass, which may further be strengthened by various strengthening processes or methods which may include, but are not limited to, mechanical polishing, hydrofluoric or other acid etching, flame polishing, ion exchange or other chemical strengthening, or other like methods. The glass optical dome 830 may further include chamfered edges. The glass optical dome 830 may further include a polished flat seating surface In other embodiments, optical domes may be made of other high strength transparent or partially transparent material, such as acrylic, sapphire, or the like for providing optical clarity for the passage of light, as well as mechanical strength, such as for example, resistance to external pressure required for deep ocean applications.

The dome bezel 810 and dome bezel retainer 820 may be polyoxymethylene. In other embodiments such components may be made of other high strength plastics, metals, or high tensile strength and high durability materials.

The housing 840 may be made of aluminum. In other embodiments, the housing may be steel, titanium, other metal alloys, or other high tensile strength and high durability materials such as high strength plastics.

The dome bezel retainer 820 may couple to the housing 840 through the mating of threads (illustrated in FIG. 9A) on the dome bezel retainer 820 and housing 840. The dome bezel 810 may be sized with a smaller internal diameter than the outermost diameter of the optical dome 830 so that when the dome bezel retainer 820 secures to dome bezel 810 via screws 850, optical dome 830 may secure (indirectly as illustrated in FIGS. 9A and 9B) to housing 840.

Figure 9A:
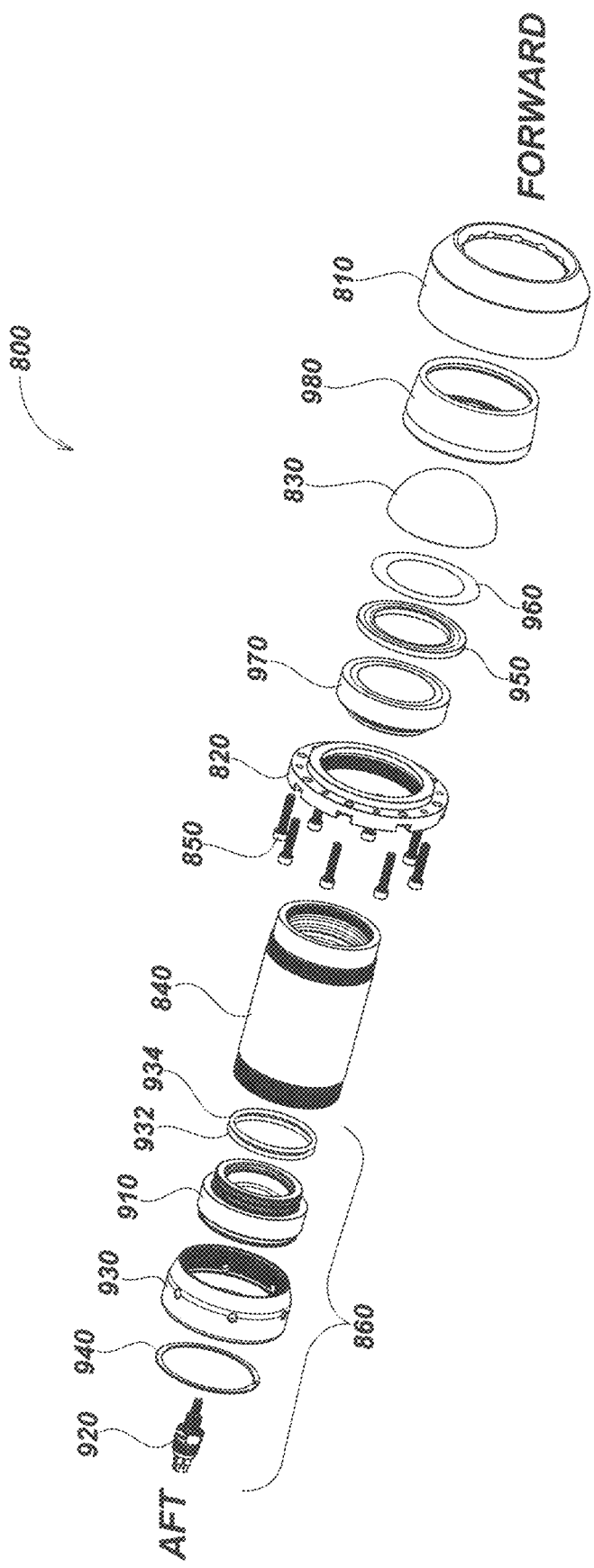
FIG. 9A illustrates an exploded view of details of the optical enclosure embodiment of FIG. 8.
Figure 9B:
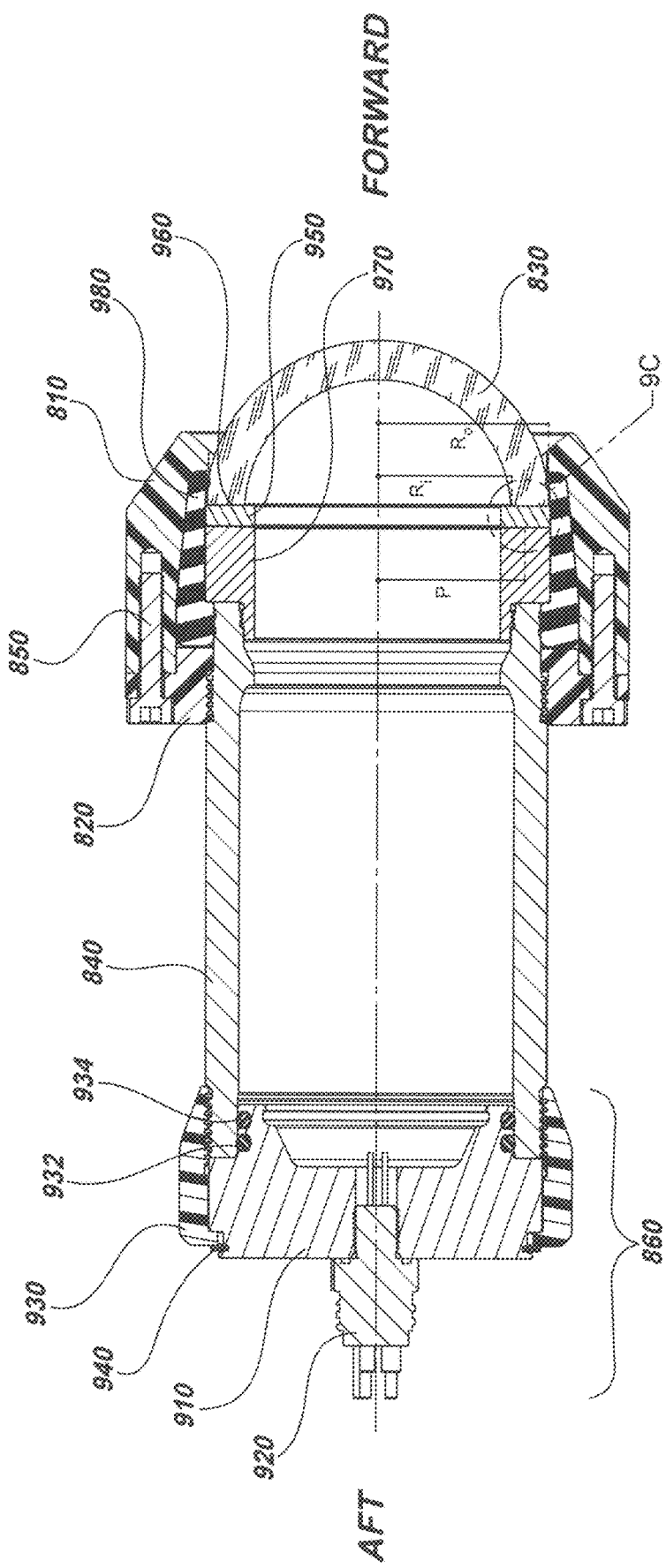
FIG. 9B illustrates a section view of details of the optical enclosure embodiment of FIG. 8 along line 9B-9B.

The optical enclosure 800 may further include an endcap assembly 860, illustrated in detail in FIGS. 9A and 9B, may be disposed on the base of housing 840 to allow the passage of power and/or data signals to electronic devices (e.g., LED lights, image or still cameras, etc.) in the optical enclosure 800 (e.g. camera 710 illustrated in FIG. 7), while expanding across the aperture of housing 840 and prevent ingress of water. As further illustrated in FIGS. 9A and 9B, the endcap assembly 860 may include an endcap 910 into which a connector 920 may fit, and an endcap retainer 930 to further secure the endcap assembly 860 to housing 840. A series of O-rings 932 and 934 may seat between the endcap 910 and housing 840 preventing the ingress of water. The endcap retainer 930 may couple to the housing 840 through the mating of threads formed on both components. The endcap retainer 930 may be shaped with region having a smaller inner diameter than the diameter of the endcap 910 such that the endcap may seat in the endcap retainer 930 and secure firmly to housing 840. A retaining ring 940 may secure within a groove along the aft end of the endcap 910 and firmly secure the endcap retainer 930 and endcap 910 together.

Referring to FIGS. 9A and 9B, the optical dome 830 may seat onto a dome seat ring 950 in assembly. The optical dome 830 and dome seat ring 950 are selected with geometry to allow for substantial uniformity of load and relative movement at the seat of the optical dome 830 to avoid movement and/or damage to a compliance layer 960. The compliance layer 960 may seat between optical dome 830 and dome seat ring 950. The compliance layer 960 may compensate for imperfections in seating surfaces on the dome 830 and dome seat ring 950 to allow movement of the dome 830 relative to the housing 840 and/or seat ring 950. The compliance layer 960 may be polyimide, polyetherimide, polyester, or like materials.

The dome seat ring 950 may have a textured seating surface into which the compliance layer 960 locks during use. The compliance layer 960 may be pressed to the dome seat ring 950 during manufacture to prevent movement of the compliance layer 960 relative to the dome seat ring 950, and in operation, when subjected to high external pressure, may be further pressed in place for friction retention.

The dome seat ring 950 may seat onto a pivot housing ring 970 that may further secure to housing 840 via mating of threads formed on the aft outward portion of the pivot housing ring 970 and the inner portion of the forward end of the housing 840. The geometries and/or materials of the optical dome 830 and dome seat ring 950 and pivot housing ring 970 (FIGS. 9A and 9B) onto which it may be seated have substantially matching or otherwise complementary movements and displacements of corresponding contact regions thereof under hydrostatic load.

Figure 9C:
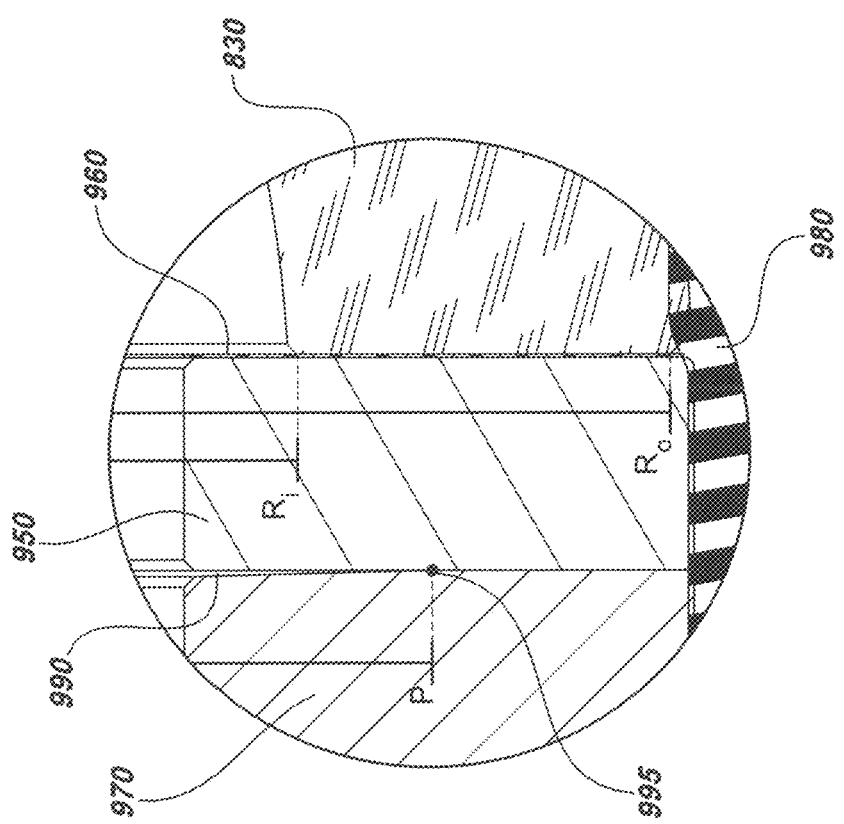
FIG. 9C illustrates a section view of details of the section 9C of the embodiment of FIG. 9B.

As illustrated in detail in FIG. 9C, the geometry of the pivot housing ring 970 may include an inwardly aft sloped pivot region 990 along a portion of the face of the pivot housing ring 970 facing the dome seat ring 950. Under hydrostatic load causing rotation type movements of optical dome 830 and dome seat ring 950, the pivot region 990 may allow the dome seat ring 950 to rotate at a pivot point 955 on the pivot housing ring 970 while still transferring load to the pivot housing ring 970 and further onto housing 840 (FIGS. 9A and 9B). The pivot point 955 is illustrated at a radius P which may be larger than the inner radius Ri but smaller than the outer radius Ro of the optical dome 830.

Referring back to FIGS. 9A and 9B, an annular dome seal 980 may also be disposed between dome bezel 810 and dome 830/dome seat ring 950 to provide a soft compliant surface against optical dome 830 that may aid in preventing point loading against the surface thereof as well as seal gaps between the dome bezel 810, dome 830, and dome seat ring 950 and prevent water from entering optical enclosure 800. The annular dome seal 980 may be HNBR rubber, ethylene propylene diene rubber (EPDM), acrylonitrilebutadiene (NBR), or other elastomer material.

The present invention should be accorded the full and widest scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the invention. Thus, the presently claimed invention is not intended to be limited to the aspects shown herein but is to be accorded the widest scope consistent with the following claims and their equivalents.

We claim:

1. A submersible optical enclosure for use in high pressure environments, comprising:
   a titanium housing having a hollow interior sized to accommodate an electronic device comprising one or more of an electronic light and an imaging device;
   a transparent pressure bearing substantially dome shaped window mechanically coupled to the housing, having an angular measurement of between approximately 164 degrees and 178 degrees and sized correspondingly to the electronic device to allow light into or out of the housing interior for lighting or imaging;
   a dome support ring comprising a material having a higher Young's modulus than the transparent pressure bearing substantially dome shaped window positioned between the housing and the transparent pressure bearing substantially dome shaped window;

a compliance material layer positioned between the annular dome support ring and the transparent pressure bearing window;

a coupling element that secures the housing, dome support ring, and port window together; and one or more water-tight seals to block water entry into the housing interior.

2. The enclosure of claim 1, wherein the electronic device comprises a video camera.

3. The enclosure of claim 1, wherein the electronic device comprises a light.

4. The enclosure of claim 1, wherein the electronic device comprises a video camera and the enclosure further comprises a light.

5. The enclosure of claim 1, wherein a mating surface/seat of the housing or seating mating surface is etched or otherwise processed to include small roughness features to lock or retain the compliance layer material loading induced deflections/movements caused by repeated pressurization and depressurization cycles.

6. The enclosure of claim 1, wherein the window is strengthened by one or more of mechanical polishing, hydrofluoric or other acid etching, flame polishing, and ion exchange.

7. The enclosure of claim 1, wherein the transparent pressure bearing substantially dome shaped window includes chamfered edges.

8. The enclosure of claim 1, wherein the transparent pressure bearing substantially dome shaped window includes a flat polished seating surface.

9. The enclosure of claim 1, wherein the transparent pressure bearing substantially dome shaped window comprises sapphire.

* * * * *